United States Patent [19]

Cooley et al.

[11] 4,329,094
[45] May 11, 1982

[54] BORING AND FACING APPARATUS FOR USE INSIDE A LARGE VESSEL

[75] Inventors: Edmund A. Cooley, Scotia, N.Y.; Robert Long, Tinley Park, Ill.; Phillip D. Ness, Scotia, N.Y.

[73] Assignee: General Electric Company, Schenectady, N.Y.

[21] Appl. No.: 955,740

[22] Filed: Oct. 30, 1978

[51] Int. Cl.² ........................................... B23B 41/00
[52] U.S. Cl. ..................................... 408/77; 408/79; 408/234; 409/143; 409/175
[58] Field of Search ............... 408/72 R, 77, 79, 234, 408/241 R, 110, 111; 409/175, 178, 179, 143

[56] References Cited

U.S. PATENT DOCUMENTS 3,509,750  5/1970  Anderson et al. ............. 409/178 X
3,513,517  5/1970  Galbarini et al. ............. 409/143 X Primary Examiner—Gil Weidenfeld
Attorney, Agent, or Firm—Joseph B. Forman

[57] ABSTRACT

The invention is directed to an improved boring and facing apparatus for performing in-situ machining on nuclear reaction feedwater inlet nozzles. The apparatus comprises a boring machine mounted upon a main frame which main frame is suspended from a structure mounted above the plane in which the inlet nozzle is located. Means are provided for adjusting the boring machine to permit a tool to operate along the center line axis of the inlet nozzle.

9 Claims, 8 Drawing Figures

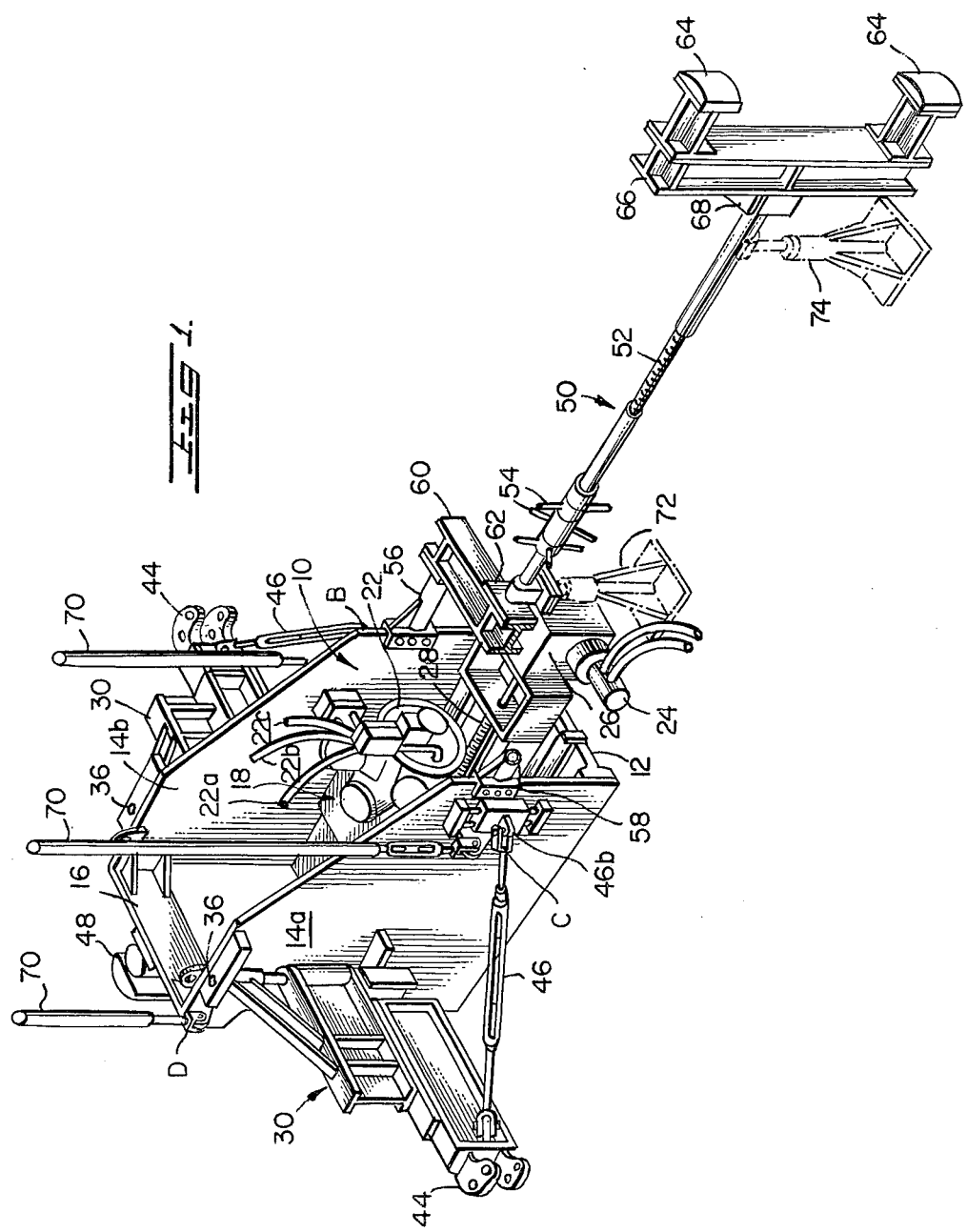

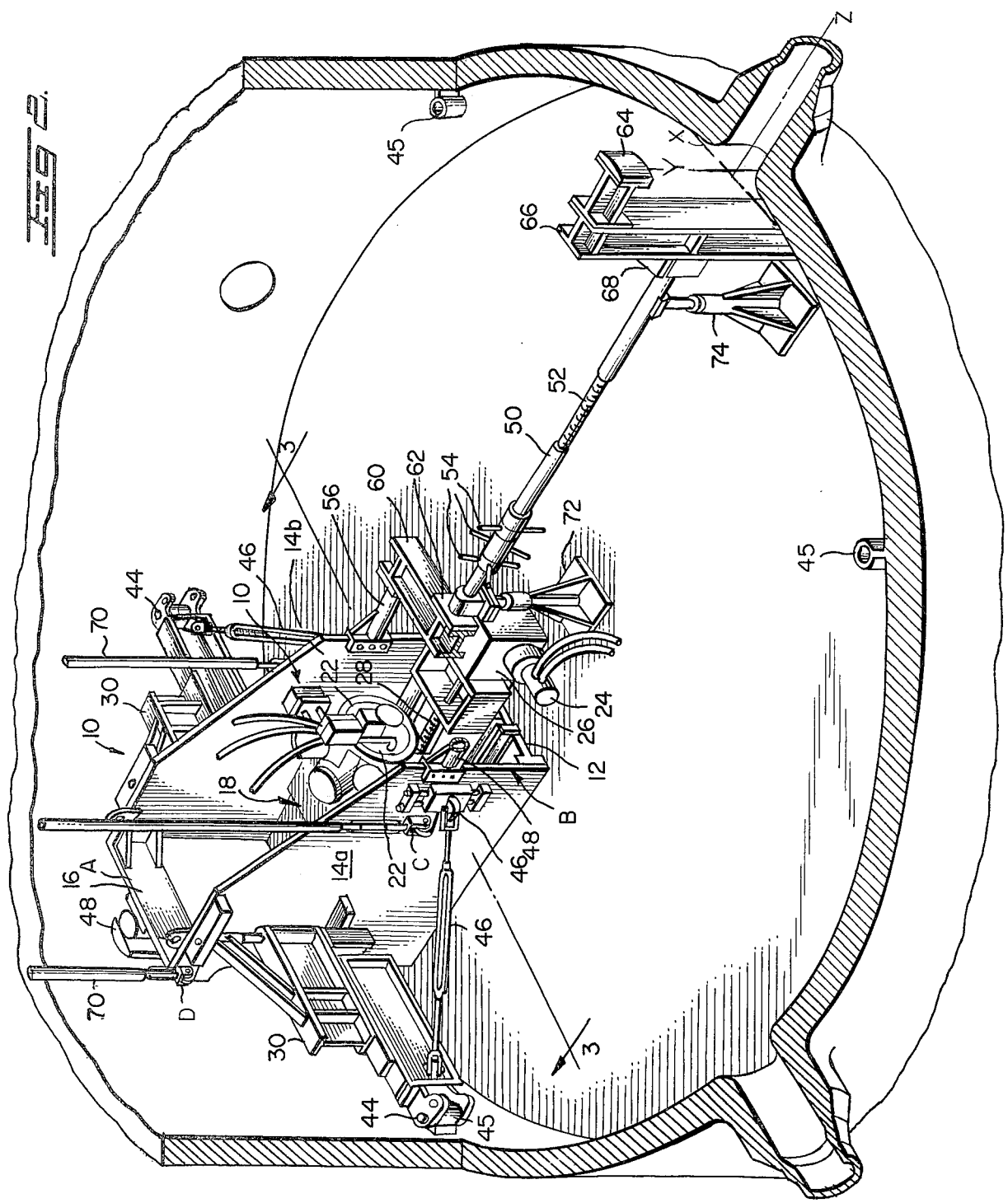

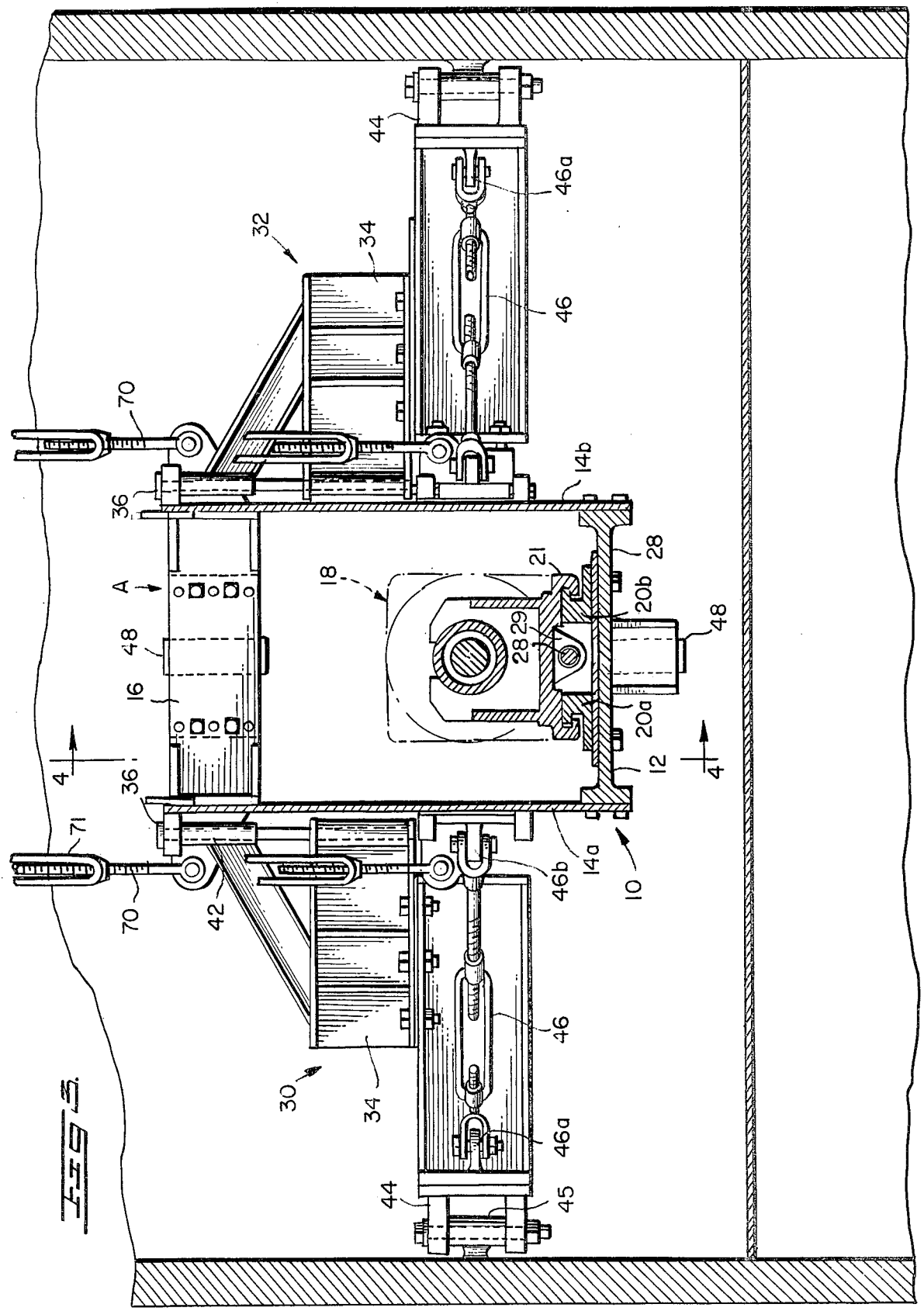

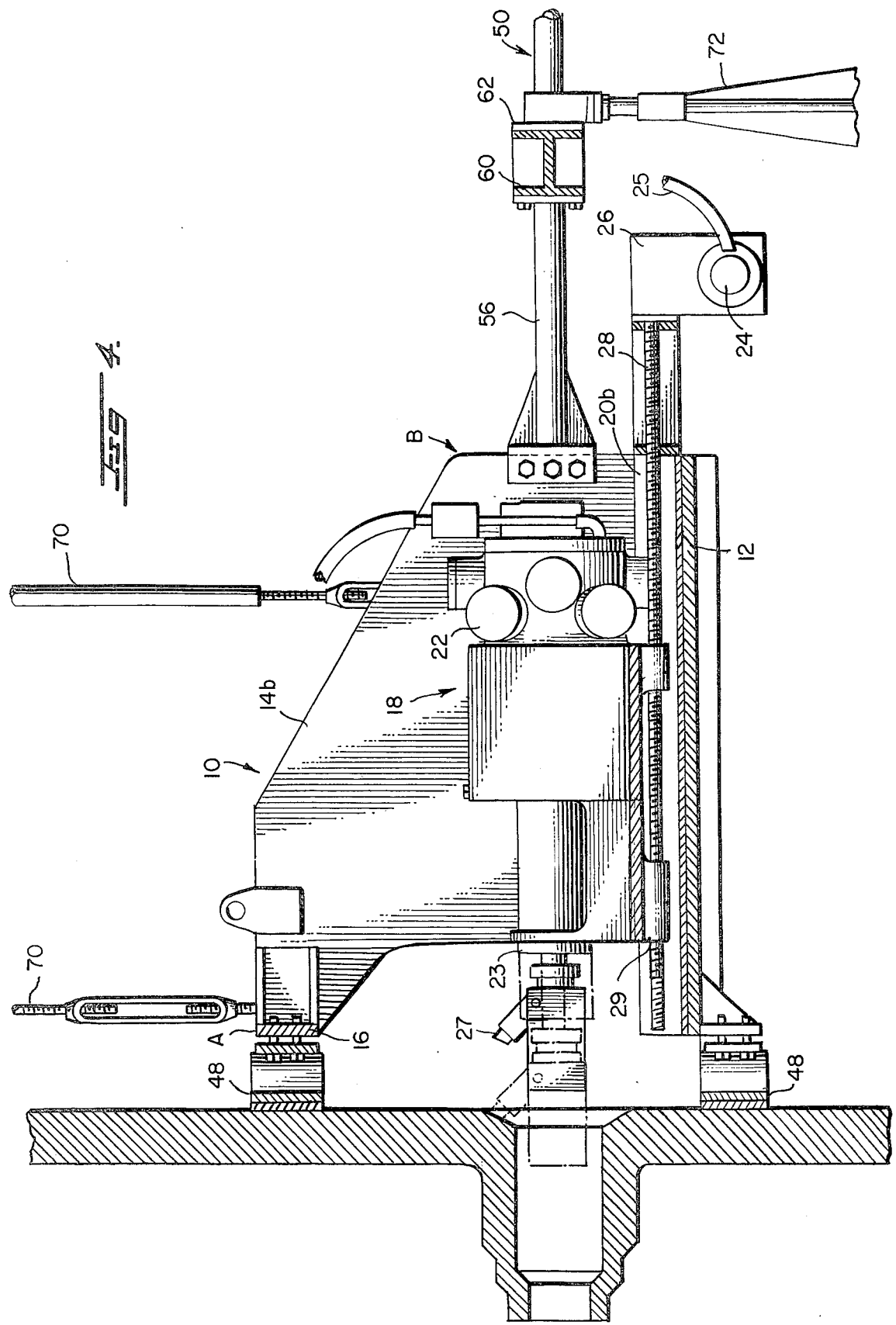

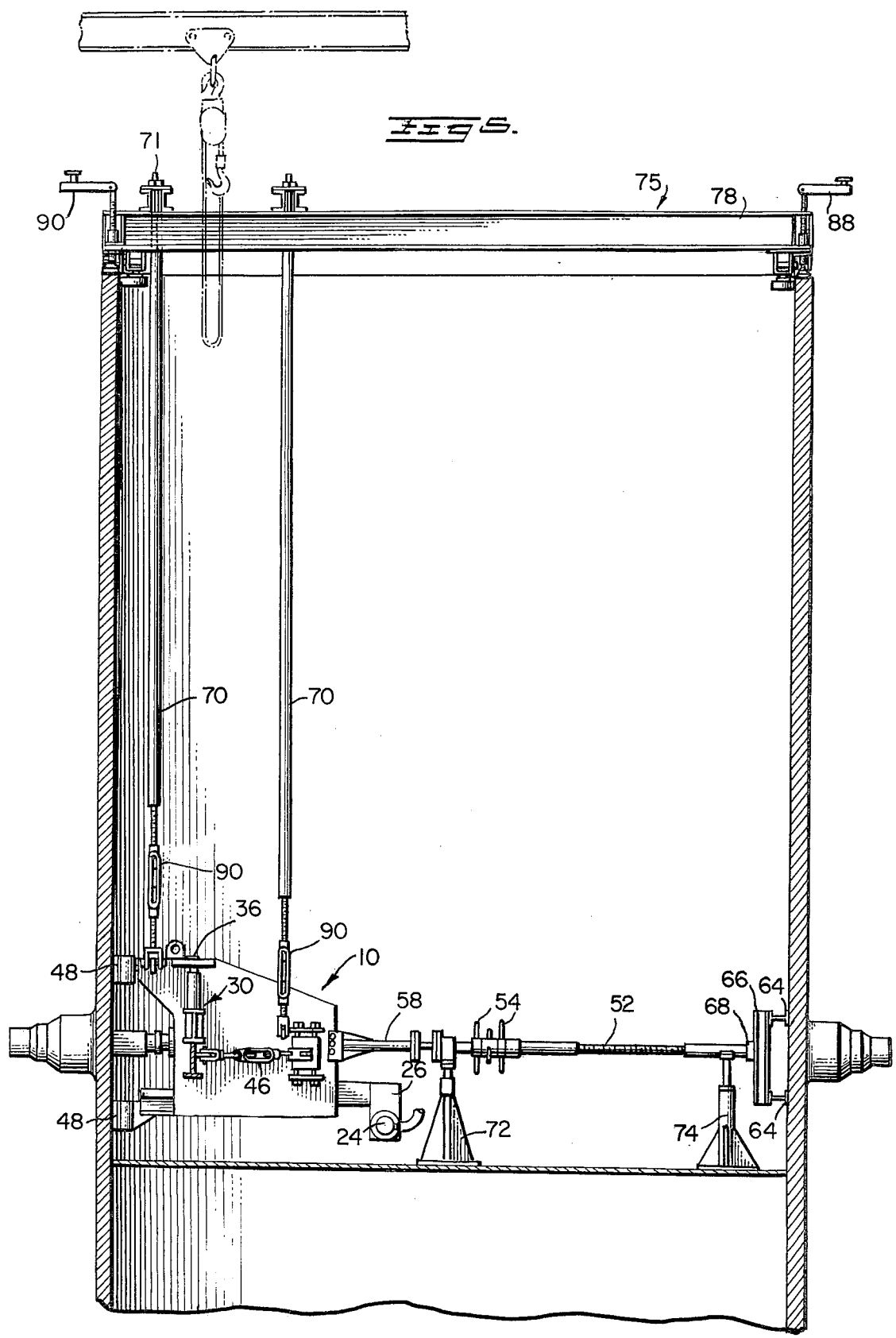

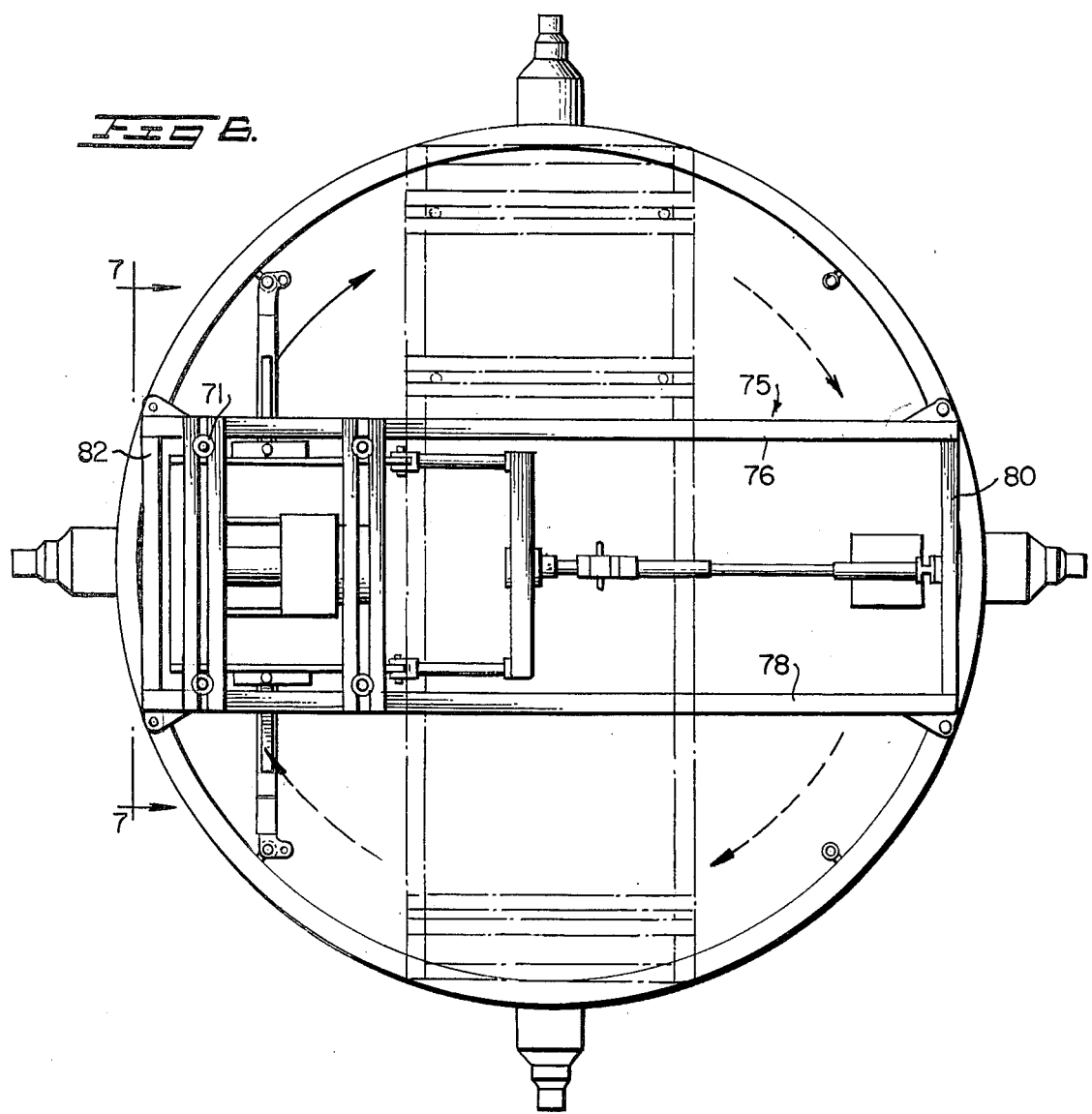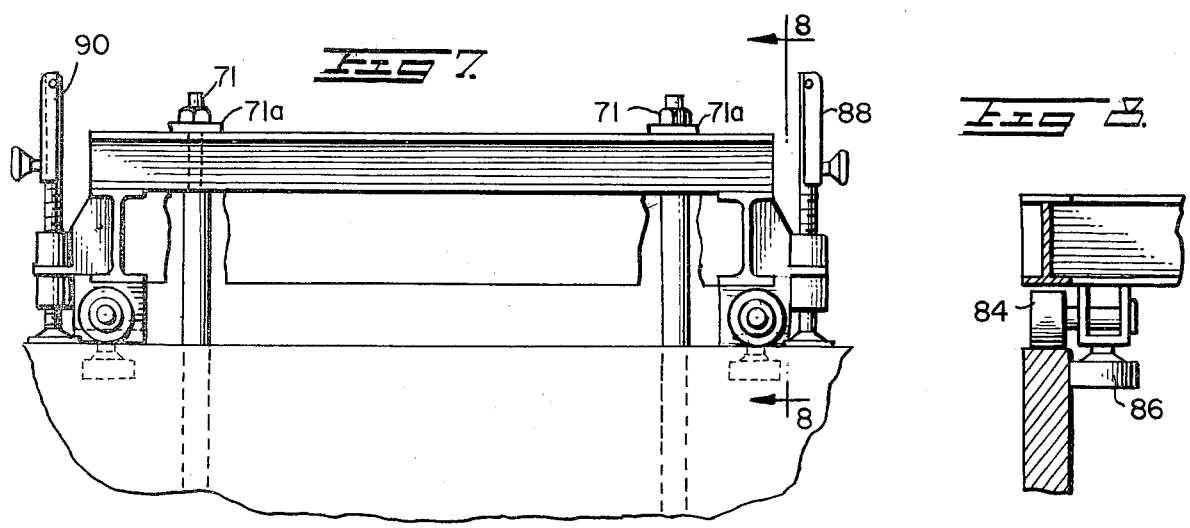

BORING AND FACING APPARATUS FOR USE INSIDE A LARGE VESSEL

This invention relates to improvements in a boring and facing apparatus and for the methods of utilizing such apparatus.

BACKGROUND AND SUMMARY OF THE INVENTION

The present invention is of an improved apparatus for performing in-situ machining and refacing of nuclear reactor feedwater inlet nozzles and the like and should find wide application, where suitable, for operation on similar devices where machining or refacing is necessary.

In general, nuclear reactor vessels are formed with a plurality of radial opening which radial openings are utilized to convey suitable liquid, such as water, to a vessel portion of the reactor wherein said liquid is utilized for shielding, conversion to steam, emergency flooding and for the extraction of generated steam from the vessel. The radial openings for feeding liquid to such vessel portion are formed with piping welded to said openings for conveying the liquid and steam to and from the vessel.

During construction of the vessel and at times after the vessel has been in use, it becomes necessary to machine or re-machine the radial openings within the reactor vessel. There are many constraints upon the manner in which such machining or re-machining may be carried out by reason of the nature of the reactor vessel.

One of the constraints requires that a rigid platform capable of supporting heavy weight and maintaining accurate positioning and alignment of machine and tools not be supported upon the interior platform of the vessel.

Another constraint requires that no welding of temporary support structures be made to the walls of the vessel.

A further constraint is found in a situation where the reactor vessel has been in use and the high levels of radiation permit very short duration work periods for people assigned to work within the vessel.

Other constraints will be well known to those practicing the art or be apparent from the discussions with respect to the drawings and the description of said drawing.

It is an object of the present invention to provide a new and improved boring and facing apparatus for machining or re-machining openings such as are found in nuclear reactor vessels and the like.

It is a further object of the invention to provide a new and improved boring and facing apparatus for machining or refacing openings which are radially disposed in a nuclear reactor vessel and wherein said apparatus may be readily and accurately positioned and remotely operated for accomplishing the desired operation.

It is a further object of the invention to provide a new and improved method for machining and refacing nuclear reactor feedwater inlet nozzles.

The objects of the invention are attained by the apparatus herein generally described. The apparatus is formed to be suspended from above the platform or floor end of the vessel, thus overcoming a major constraint upon the placement of a heavy weight upon the platform or floor of the vessel. To avoid weldments to the wall of the vessel during the period when the apparatus herein described is used for its intended purpose, use is made of existing sparger brackets to which the apparatus is coupled.

The apparatus is provided with a supportive structure which spans the upper opening of the reactor vessel resting on the upper wall and having a first plurality of wheels for rotation of the structure and a second plurality of wheels within the structure, perpendicular to the first plurality of wheels to keep the structure from running off the top of the reactor vessel. A plurality of jacks are provided proximate the first plurality of wheels so that the first plurality of wheels may be raised to prevent rotation of the supportive structure during use of the apparatus.

From the supportive structure a main frame or cradle is suspended by hanger rods. The main frame is provided with outriggers, the free end whereof are adapted to engage and be connected to the sparger brackets of the vessel. A first pair of vertical nose pads are provided at the front end of the main frame between the outriggers, are intended to abutt the vessel wall and provide part of a structure for connecting thrust of a boring machine which is mounted in the main frame. The other part of the structure for countering thrust of the boring machine comprises a spreader bar having one end coupled to the back end of the main frame and the other end coupled to a second vertical pair of nose pads which engage the vessel wall at a point substantially diametrically opposite the vessel wall engaged by the first pair of vertical nose pads.

The boring machine referred to above is mounted upon a set of ways for movement toward and from the front end of the cradle and the machine is provided with a chuck for mounting a tool desired to perform a boring and/or facing operation. A table may be interposed between the ways and the main frame to permit vertical or skew positioning of the boring machine relative to the cradle.

Other objects and advantages of the present invention as well as a more detailed description of the invention will be obvious to those skilled in the art when reference is had to the specification and drawings herein.

DESCRIPTION OF THE DRAWINGS

FIG. 1 is a perspective view of the present invention.

FIG. 2 is a perspective view similar to FIG. 1 showing the apparatus secured in working position within the confines of a large cylindrical vessel for boring ports from within its inner periphery.

FIG. 3 is a transverse horizontal detailed cross-section taken substantially along the line 3—3 of FIG. 2, showing the positional and securing means of the present apparatus within the confines of a cylindrical vessel.

FIG. 4 is an enlarged detailed fragmentary sectional view taken along the line 4—4 of FIG. 3 and shows the detailed structure of the apparatus in secured and working position for boring a flared port in the inner sidewall of a cylindrical vessel.

FIG. 5 is a side elevational view of the apparatus shown in FIGS. 1-4 within a cylindrical vessel and the associated apparatus for suspending the boring apparatus within the vessel.

FIG. 6 is a top plan view of FIG. 5 showing the rotatable and positional capabilities of the suspension apparatus for moving the suspended boring apparatus (FIGS. 1-5) to peripherial alignment with a port to be bored.

FIG. 7 is an enlarged detailed view of one end of the suspension apparatus; showing the means for providing rotation and positioning.

FIG. 8 is a sectional view taken along the line 8—8 of FIG. 7.

DESCRIPTION OF THE APPARATUS

In detail, and referring to FIGS. 1-4, the apparatus of the invention comprises a substantially U-shaped main frame or rigid cradle 10, having a horizontal base member 12, and vertical substantially parallel and spaced apart first and second side members 14a and 14b. The side members 14a and 14b are secured to the base member 12 by bolting the same together, welding the units together or in any other manner well known in the art. If desired the U-shaped main frame or cradle could be cast as a single structure.

The side members 14a and 14b are further maintained and aligned in parallel and spaced apart relationship by a front spacer member 16.

Disposed between side members 14a and 14b and secured to base member 12 is a horizontally slidable boring machine 18. The horizontal boring machine comprises a pair of ways 20a and 20b, which are aligned in parallel to one another and sidewalls 14a and 14b and upon which is slidably mounted the base 21 of a boring machine motor 22 with its associated gearing, power lines 22a and 22b, 22c and a chuck 23 within which a boring tool 27 is to be secured.

Horizontal movement and position of the boring machine motor 22 is under control of a position control motor 24, obtaining power through lines 25, and suitably geared by a gear box 26 to a longitudinal drive screw 28 which drive screw is coupled to the base 21 of boring machine motor 22 by means of cooperating threaded members 29 for the purpose of moving and positioning the boring machine motor 22 respective ways 20a and 20b.

Outwardly of sidewalls 14a and 14b are outrigger members 30 and 32. Only outrigger member 30 is described in detail, it being understood that outrigger member 32 is the mirror image of outrigger member 30.

Outrigger 30 comprises a horizontal beam assembly 34 rotatably mounted on an axle 36 secured by brackets 38, 40 to the sidewall 14a. Within the brackets 38 and 40 are located an upper bearing 42 shown and a corresponding lower bearing, not shown wherein the axle 36 is mounted. At the outer extremity of horizontal beam assembly, and remote axle 36 is one member of an anchor bracket 44, formed in a U-shape and adapted to engage a mating sparger bracket 45, not forming a part of the apparatus per se, but, to be hereinafter described.

The position of outrigger 30 respective the main frame and sidewall 14a is maintained by means of a turnbuckle 46 having one end thereof 46a coupled to the horizontal beam proximate the anchor bracket 44, and the other end thereof 46b coupled to sidewall 14a. The turnbuckle 46 is positioned to permit the position of outrigger 30 to be adjusted to meet particular parameters encountered in the use of the apparatus.

At the front end A of the apparatus is a first pair of spaced apart nose pads 48, one above and one below the longitudinal axis of the boring machine motor assembly and its associated chuck, the use whereof will hereinafter be described.

Further associated with the apparatus, and at the back end B thereof, is an adjustable spreader bar 50 which may be formed to a desired length by means of the insertion of fixed spacers or threaded members such as 52, or by adjusting means such as 54. Spreader bar 50 is coupled to and centered respective the sidewalls 14a and 14b of the main frame 10 by means of brackets 56, 58 to which is secured a cross member 60 having coupling means 62, one extremity of spreader bar 50 being inserted in coupling means 62.

At the extremity of spreader bar 50 remote its coupling to the main frame 10 is a second pair of spaced apart nose pads 64 mounted to said spreader bar 50 by means of an eye beam 66 which eye beam 66 is coupled to the spreader bar through coupling means 68.

Since it is contemplated that the apparatus main frame will be suspended from above, there is provided a plurality of hanger rods 70 associated with turnbuckles 71. Hanger rods 70 are coupled at their lower points to the side walls 14a, 14b of the apparatus as at points C and D.

Jacks 72 and 74 shown in FIG. 1 may be optionally coupled to spreader bar 50, however they are used in practicing the method of boring feedwater nozzles where the length of spreader bar 50 warrants support of the bar.

Reference is had to FIGS. 5-8 for a description of the supportive structure for the main frame or rigid cradle 10.

The supportive structure comprises a rectangular structure 75 having side members 76 and 78 and end members 80 and 82 as shown in FIG. 6. A pair of I beams parallel to end member 80 is disposed across side members 76 and 78 and form the immediate support for the main frame 10 since hanger rods 70 are secured to said eye beams by means of nuts 71 over washers 71a and engaging threaded ends of the hanger rods 70.

The entire supportive structure may be rotated respective the multiple feedwater inlet pipes by means of wheels 84 which ride atop the vessel wall and wheels 86 which ride against the inner surface of the vessel wall. To prevent motion of the supportive structure jacks 88 and 90 shown in FIGS. 5 and 7 are adjusted to a position at which wheels 84 are above the top surface of the vessel wall. Jacks 88 and 90 may also be used to tilt the cradle should such maneuver be necessary as will be hereinafter discussed.

OPERATION OF THE APPARATUS

In utilizing the apparatus of the invention, for the purpose intended, it should first be borne in mind that it is essential, that the chuck and its associated tool be aligned with the center line of the inlet nozzle end associated pipe. The foregoing entails adjustment in X, Y and Z axis, all perpendicular to one another. As an example the X axis is taken in a plane horizontal to the floor of the vessel, and across the nozzle opening, the Z axis is taken in a plane horizontal to and parallel to the inlet nozzle and associated pipe and perpendicular to that X axis, and the Y axis is taken in a plane vertical to the floor of the vessel and perpendicular to the X and Z axis.

The main frame and boring machine are first lowered into the reactor vessel and suspended from supportive structure 75 at a position substantially such that the center line of the chuck 23 of the boring machine is in line with the center line of a nozzle to be worked upon. Outriggers 30 and 32 are then attached to the sparger brackets 45 and the second pair of nose pads are positioned proximate the inner wall of the cylinder at approximately diametrically opposite the position of the first pair of nose pads.

Horizontal positioning of the center line of the boring machine chuck and the tool to be inserted therein is accomplished by adjustment of the turnbuckles 46 and vertical adjustment of the boring machine chuck and tool is accomplishable by the adjustment of the hanger rods associated turnbuckles 90 as shown in FIG. 5. The nose pads 48 are intended to butt against the inside of the vessel cylinder wall both above and below the center line of the nozzle, however it is to be understood that the first pair of nose pads may each be provided with a yoke and trunnion arrangement to permit the respective pads to be adjusted so that they abutt the cylinder wall at the conclusion of the alignment process. The second pair of nose pads may each likewise be provided with a yoke and trunnion to permit said nose pads to abutt the opposite inside of the cylinder wall.

For purposes of clarity a table has not been shown between the base of the main frame and the boring machine assembly, however, such a table may be interposed therebetween such that the table could be tilted by means of screw jacks and alignment bolts to elevate and skew the boring machine relative to the main frame to accomplish a precise alignment between the boring machine chuck and tool axis and the centerline axis of the nozzle opening.

After the apparatus has been aligned with the nozzle opening, and an appropriate tool has been inserted in the chuck of the apparatus the first and second set of nose pads are adjusted to abutt the opposite sides of the cylindrical wall of the vessel. Where necessary jacks are utilized to support the spreader structure between the back end of the main frame and the second pair of nose pads.

With the apparatus firmly positioned so that the center line of the boring machine tool and the center line of the nozzle are aligned the process of boring or machining is ready to take place.

As shown in the drawings, hydraulic power is utilized for the boring machine motor 22 as well as position control motor 24. The hydraulic motors are preferable because of their stall characteristics.

The associate equipment for powering and monitoring the operation of the boring machine has been omitted by reason of the fact that a variety of configurations, well known in the art, may be utilized for such purpose.

Modifications and alterations from the specific structure disclosed herein will occur to others from a reading and understanding of the present specification and it is intended that the claims herein include such modifications and alterations to the extent they come within the spirit and scope of said claims.

We claim:

1. Apparatus for machining a feedwater nozzle of a reactor vessel including a cylindrical sidewall member, a floor member at one extremity of said cylinder wall and a peripheral area at the top and at the other extremity of said cylinder wall, and said cylindrical sidewall member including sparger brackets substantially equally spaced on opposite sides of said feedwater nozzle, comprising:

(a) a main frame, having a base, sidemembers, a front end and a back end;
(b) means for suspending said main frame from a support structure to be supported upon the peripheral area of said cylinder wall;
(c) said means for suspending said main frame including means for adjusting the vertical distance of said main frame below said support structure;
(d) a pair of outriggers extending from said main frame on opposite sides thereof and including means for coupling each of said outriggers to one of the said spaced apart sparger brackets;
(e) a first pair of nose pads vertically spaced apart from one another and secured to said main frame at the front end thereof;
(f) a second pair of nose pads vertically spaced apart from one another and means coupling said second pair nose pads to the back end of said main frame;
(g) a boring machine slideably moveable on said main frame; and
(h) means for adjusting the position of said boring machine respective the center line of a feedwater nozzle in three planes perpendicular one to the other.

2. Apparatus as defined in claim 1 and wherein each said outrigger is rotatably mounted at one end thereof to a sidewall member of said main frame and includes means for adjusting the position of said outrigger respective said sidewall member.

3. Apparatus as defined in claim 2 and wherein said means for adjusting the position of said outrigger is a turnbuckle.

4. Apparatus as defined in claim 1 and wherein said means for suspending said main frame from a support structure includes means for rotating said suspending means along the peripheral area of said cylinder wall.

5. Apparatus as defined in claim 4 and wherein said means for rotating said suspension means along said peripheral area of said cylinder wall includes a first plurality of spaced apart wheels in a vertical plane and a second plurality of spaced apart wheels in a horizontal plane, said first plurality of wheels being adapted to rest upon the peripheral area of said cylinder wall and said second plurality of wheels being adapted to ride on the inner surface of said cylindrical sidewall member.

6. Apparatus as defined in claim 1 and wherein said first and second pair of nose pads include individual means for adjusting the position of each of said nose pads in a horizontal position respective said front and back ends of said main frame.

7. Apparatus as defined in claim 1 and wherein said means coupling said second pair of nose pads to the back end of said main frame includes means for adjusting the distance between said second pair of nose pads and said back end of said main frame.

8. Apparatus as defined in claim 1 and wherein said boring machine includes a pair of ways mounted to said main frame said ways being substantially parallel to said main frame side walls, and a motor slideably mounted respective said ways.

9. Apparatus as defined in claim 1 and including means for vertically positioning said motor respective said main frame.

* * * * *